United States Patent
Teramoto

(10) Patent No.: US 7,395,034 B2
(45) Date of Patent: Jul. 1, 2008

(54) CLIPPING CIRCUIT AND RADIO TRANSMITTER USING THE SAME

(75) Inventor: Tomoyuki Teramoto, Tokyo (JP)

(73) Assignee: NEC Corporation (JP)

( * ) Notice: Subject to any disclaimer, the term of this patent is extended or adjusted under 35 U.S.C. 154(b) by 119 days.

(21) Appl. No.: 10/578,316

(22) PCT Filed: Oct. 4, 2004

(86) PCT No.: PCT/JP2004/016299

§ 371 (c)(1),
(2), (4) Date: May 4, 2006

(87) PCT Pub. No.: WO2005/046154

PCT Pub. Date: May 19, 2005

(65) Prior Publication Data

US 2007/0087705 A1    Apr. 19, 2007

(30) Foreign Application Priority Data

Nov. 5, 2003    (JP)    ............................. 2003-375071

(51) Int. Cl.
*H04Q 11/12*    (2006.01)
(52) U.S. Cl. ..................... 455/116; 455/114.3; 330/150
(58) Field of Classification Search ................ 455/116, 455/114.3, 127.2, 127.3; 330/150; 375/296, 375/297

See application file for complete search history.

(56) References Cited

U.S. PATENT DOCUMENTS

| 3,686,489 A | * | 8/1972 | Hobrough | .................. 708/100 |
| 6,947,710 B2 | * | 9/2005 | Samuels et al. | ............... 455/95 |
| 2003/0104792 A1 | | 6/2003 | Doi | |

FOREIGN PATENT DOCUMENTS

| CN | 1286542 | 3/2001 |
| EP | 1 081 851 A2 | 3/2001 |
| EP | 1 318 600 A2 | 6/2003 |
| JP | 63-198174 | 8/1988 |
| JP | 2001-69184 | 3/2001 |
| JP | 2003-168931 | 6/2003 |

OTHER PUBLICATIONS

International Search Report mailed Feb. 1, 2005.

* cited by examiner

*Primary Examiner*—Lee Nguyen
(74) *Attorney, Agent, or Firm*—Dickstein, Shapiro, LLP.

(57)    ABSTRACT

A clipping circuit to limit amplitude of an orthogonal baseband signal includes a 16-gonal clipping circuit almost equivalent to a circular clipping circuit. The 16-gonal clipping circuit includes plural stages of series-connected units each including a rectangular clipping circuit and a phase rotating module. To compensate for variation in the signal amplitude due to the rectangular clipping circuits and the phase rotating modules, an amplitude adjuster conducts amplitude scaling for the signal.

9 Claims, 10 Drawing Sheets

F I G. 3
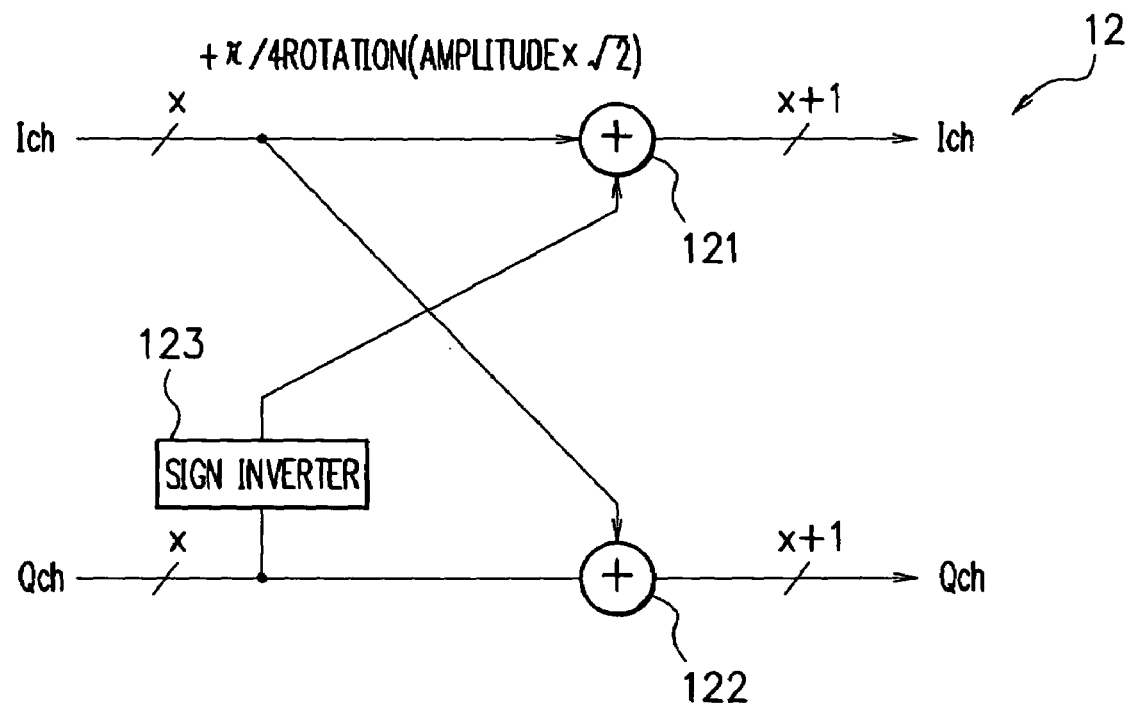

CASE OF π/4 ROTATION

CASE OF π/8 ROTATION

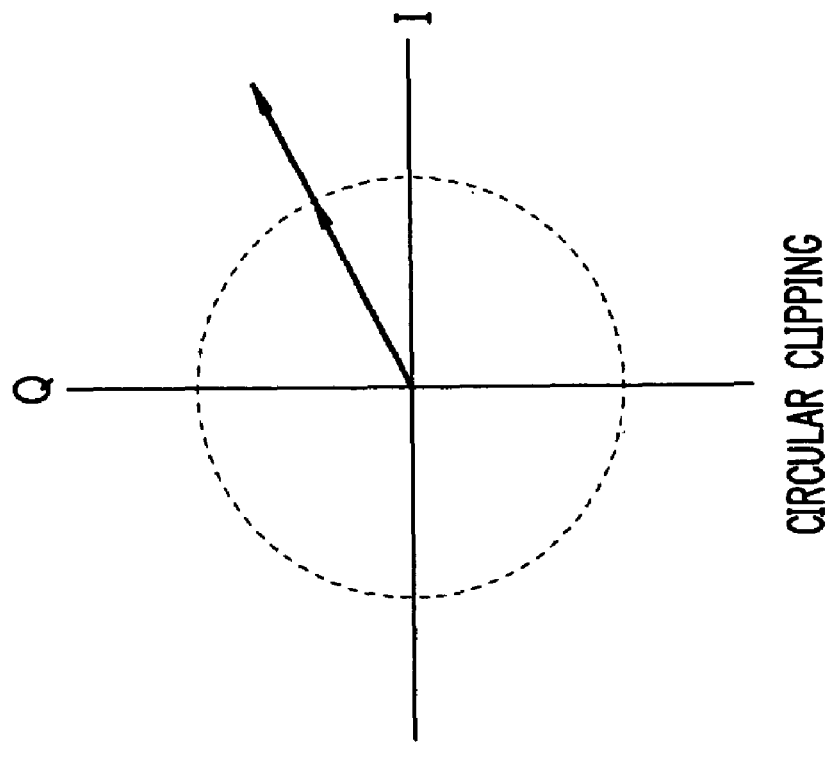
F I G. 10A   RECTANGULAR CLIPPING
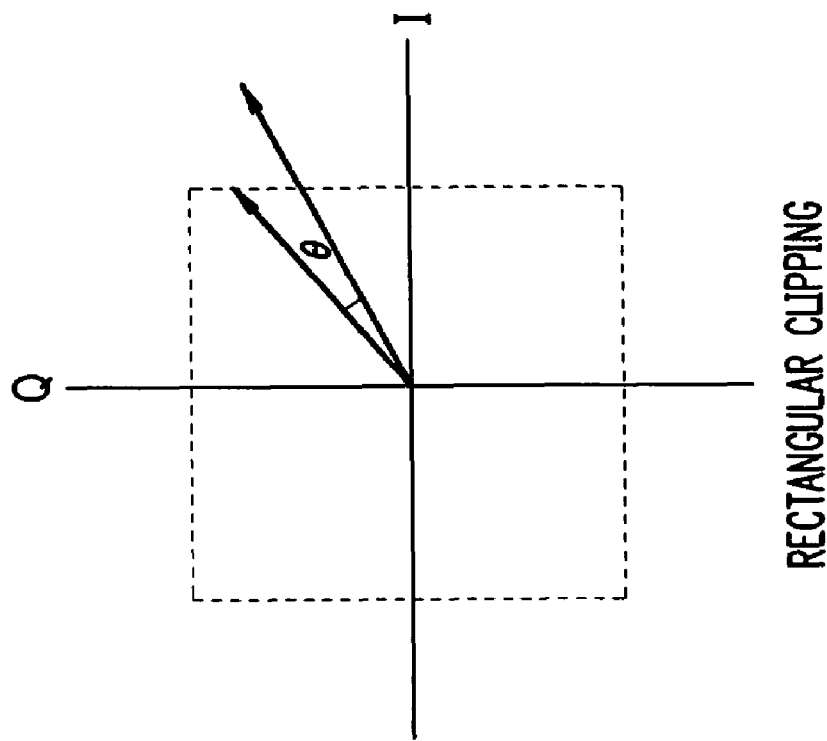
F I G. 10B   CIRCULAR CLIPPING

CLIPPING CIRCUIT AND RADIO TRANSMITTER USING THE SAME

BACKGROUND OF THE INVENTION

1. Field of the Invention

The present invention relates to a clipping circuit and a radio transmitter using the same, and in particular, to a clipping method for use in a radio transmitter for limiting the amplitude of orthogonal baseband signals supplied to a power amplifier in a radio transmitter.

2. Description of the Prior Art

In a radio communication system, it is ideal on the side of a radio transmitter to use a power amplifier having an appropriate linear characteristic for all amplitude values of transmission signals. However, such a power amplifier with the favorable linearity for all transmissible amplitude values cannot be easily implemented in consideration of a circuit size, cost of the amplifier circuit, and power consumed by the circuit. There is hence employed in many cases a general power amplifier having linearity up to a particular amplitude and nonlinearity beyond the amplitude.

When a power amplifier circuit amplifies a transmission signal multiplexed for a plurality of transmission channels using, for example, a Code Division Multiple Access (CDMA) scheme or an Orthogonal Frequency Division Multiplexing (OFDM) scheme, the width of the amplitude value of a signal to be amplified becomes greater as the number of channels of signals to be multiplexed into one Radio Frequency (RF; high frequency) output signal increases. When this signal is amplified by the inappropriate power amplifier described above, the RF output signal is distorted if the signal has an amplitude value exceeding an amplitude value range associated with the linear characteristic of the power amplifier. The output signal distorted in this manner interferes adjacent communication channels and deteriorates modulation accuracy, resulting in a deteriorated Bit Error Rate (BER) of a transmission path employed to send the signal.

Various proposals have been offered to suppress the distortion of the RF output signal. An example is the clipping of a baseband signal including I and Q signals at a baseband signal processing module to process the transmission data. Representative clipping methods include a rectangular clipping scheme described in Japanese Patent Application Laid-Open No. 63-198174 and a circular clipping scheme.

Although the rectangular clipping is feasible by a small-sized circuit, a phase error disadvantageously takes place in the clipped data. In the rectangular clipping method, I direction clipping is independently performed for an I component of the baseband signal and Q direction clipping is also carried out independently for a Q component of the baseband signal. Therefore, if the I component exceeds a clip level indicated by a broken line and the Q component is below the clip level, as shown in FIG. 10A, only the I component is clipped. In a vector element obtained as a result of the clipping, there appears a phase error of θ with respect to the original vector element. Occurrence of the phase error deteriorates the Error Vector Magnitude (EVM) of the modulated wave.

On the other hand, in the circular clipping scheme, the I and Q components of the baseband signal are clipped on the basis of the phase. This does not cause the phase error of the rectangular clipping (FIG. 10B). However, since the circular clipping is conducted through processing of arithmetic calculation or by reading data items from a Read Only Memory (ROM) table, there exists a disadvantage that the circuit size becomes larger as the number of bits of the I and Q components increases. It is also disadvantageous that the circuit size considerably varies depending on an input dynamic range assumed for the circuit operation.

SUMMARY OF THE INVENTION

It is therefore an object of the present invention to provide a clipping circuit being a relatively small size and capable of suppressing occurrence of the phase error without deteriorating the error vector magnitude.

In accordance with the present invention, there is provided a clipping circuit for limiting amplitude of an orthogonal baseband signal to be supplied to a power amplifier in a radio transmitter. The clipping circuit includes a polygonal clipping module including a plurality of stages in cascade connection. Each of the stages includes a rectangular clipping module and a phase rotating module connected in series.

Additionally, the clipping circuit further includes an amplitude adjusting module for compensating and adjusting a change in signal amplitude of the baseband signal from the rectangular clipping module and the phase rotating module. Moreover, the clipping circuit includes n (an integer equal to or more than two) stages in cascade connection, each of the stages including the rectangular clipping modules and the phase rotating modules connected in series. The rectangular clipping module in a first stage includes a clip level beforehand set to a predetermined clip level. Each of the rectangular clipping modules in a second and subsequent stages includes a clip level set to a value obtained by multiplying the predetermined clip level by a quantity of correction corresponding to variation in amplitude of the baseband signal associated with phase rotation in the phase rotating module in a previous stage of the rectangular clipping module.

Also, the clipping circuit further includes a control module for controlling, if the amplitude of the orthogonal baseband signal takes a value more than the predetermined clip level, the polygonal clipping module to process the orthogonal baseband signal.

In addition, if the amplitude of the orthogonal baseband signal takes a value equal to or less than the predetermined clip level in the clipping circuit, the control module adjusts time for output of the orthogonal baseband signal corresponding to processing time of the polygonal clipping module. In accordance with the present invention, there is provided a transmitter including one of the clipping circuits described above.

Description will now be given of operation in accordance with the present invention. A rectangular clipping circuit and a phase rotating circuit in a simple configuration are connected in series. There are formed several stages of cascade connection of the series-connected circuits to perform polygonal clipping that suppresses the phase error and tends toward circular clipping, which does not produce a phase error in principle.

In accordance with the present invention, by realizing the polygonal clipping in a simple circuit configuration, there can be obtained an advantage substantially equal to that of the circular clipping. That is, the phase error can be reduced as much as possible and thereby prevent deterioration in the error vector magnitude of the modulated wave.

BRIEF DESCRIPTION OF THE DRAWINGS

The objects and features of the present invention will become more apparent from the consideration of the following detailed description taken in conjunction with the accompanying drawings in which:

FIG. 3 is a schematic diagram showing a phase rotating operation of a phase rotating section 12 of FIG. 2;

FIG. 10A is a graph showing an example of a phase error in rectangular clipping; and FIG. 10B is a graph showing an example of a phase error in circular clipping.

DESCRIPTION OF THE EMBODIMENTS

Figure 1:
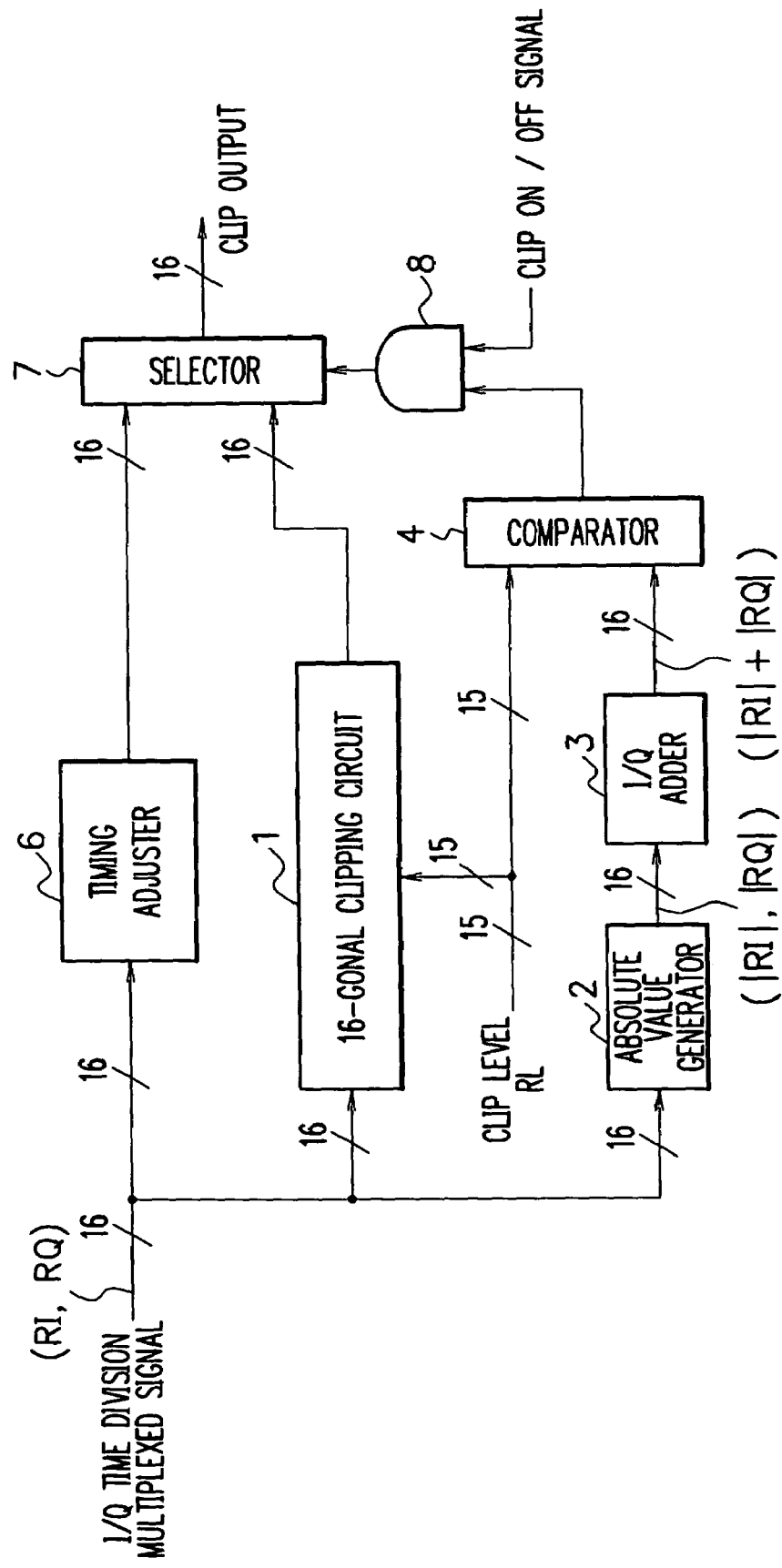
FIG. 1 is a schematic block diagram showing a configuration of an embodiment in accordance with the present invention.

Referring next to the drawings, description will be given in detail of an embodiment in accordance with the present invention. FIG. 1 shows a block diagram of an embodiment of the present invention. In the configuration of FIG. 1, after a baseband signal is processed, orthogonal components of the baseband signal, i.e., an I component (RI) and a Q component (RQ) are fed to a timing adjuster 6, a 16-gonal clipping circuit 1, and an absolute value generator 2.

The generator 2 conducts an absolute value creating operation according to the I and Q components and delivers resultant signals to an adder circuit 3. The adder 3 adds the respective signals to each other to produce a signal, which is then fed to a comparator 4. The comparator 4 compares a value of amplitude of the baseband signal produced from the adder 3 with a signal level (a clip level=RL) beforehand determined for the clipping in the radio communication system. If the amplitude value of the baseband signal is equal to or more than the clip level RL as a result of the comparison, the comparator 4 delivers a signal to an AND gate 8 to control a selector 7 such that a signal processed by the 16-gonal clipping circuit 1 is fed from the selector 7 to a subsequent circuit. On the other hand, if the amplitude value of the baseband signal is less than the clip level RL as a result of the comparison, the selector 7 is controlled by a signal from the AND gate such that a signal processed by the timing adjuster 6 is transferred from the selector 7 to a subsequent circuit.

The timing adjuster 6 is disposed to adjust output timing for the signal clipped by the clipping circuit 1 and the signal not passed through the circuit 1. The adjuster 6 includes a plurality of stages of buffers, the number of stages corresponding to a period of time required for the clipping operation in the circuit 1. The AND gate 8 is arranged to control "on" and "off" of the clipping operation according to an external instruction. In FIG. 1, the numerals over the signal lines indicate the number of parallel bits. However, this only shows an example of signal lines.

Figure 2:
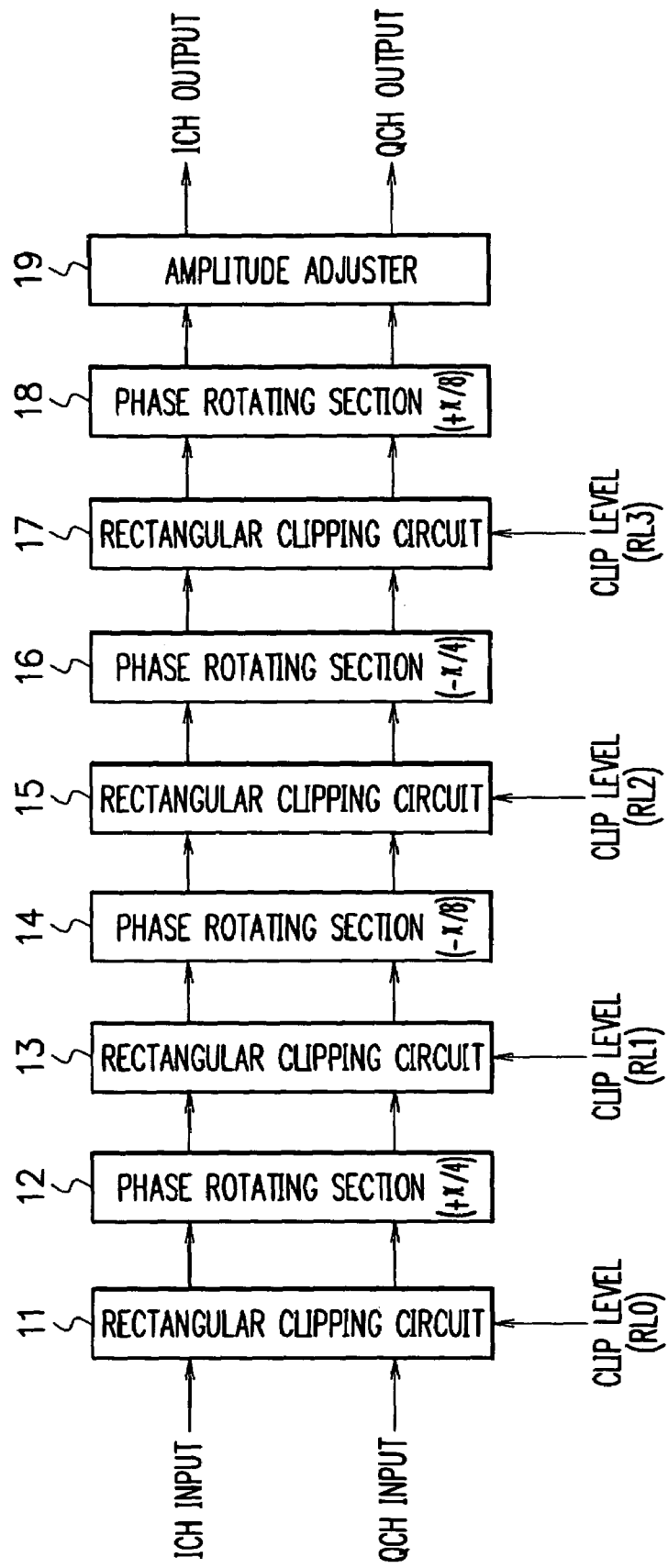
FIG. 2 is a functional block diagram of a 16-gonal clipping circuit 1 shown in FIG. 1.

FIG. 2 shows, in a block diagram, functions of constituent components disposed in the clipping circuit 1 of FIG. 1. The circuit 1 includes a rectangular clipping circuit 11, a $+\pi/4$ phase rotating section 12, a rectangular clipping circuit 13, a $-\pi/8$ phase rotating section 14, a rectangular clipping circuit 15, a $-\pi/4$ phase rotating section 16, a rectangular clipping circuit 17, a $+\pi/8$ phase rotating section 18, and an amplitude adjusting module (amplitude scaling module) 19 arranged in order from an input stage to an output stage.

The rectangular clipping circuits 11, 13, 15, and 17 are substantially equal in the configuration to each other and are produced in a known configuration, for example, a circuit configuration of Japanese Patent Application Laid-Open No. 63-198174. Each of the circuits includes a function in which when a clip level is supplied as an input thereto, the circuit clips the I component (Ich) and the Q component (Qch) of the input signal separately. Specifically, the I and Q signals are respectively clipped in the I-axis and Q-axis directions. The phase rotating module 12 rotates the phase of an input signal by $+\pi/4$, the module 14 rotates the phase of an input signal by $-\pi/8$, the module 16 rotates that of an input signal by $-\pi/4$, and the module 18 rotates the phase of an input signal by $+\pi/8$.

Figure 6:
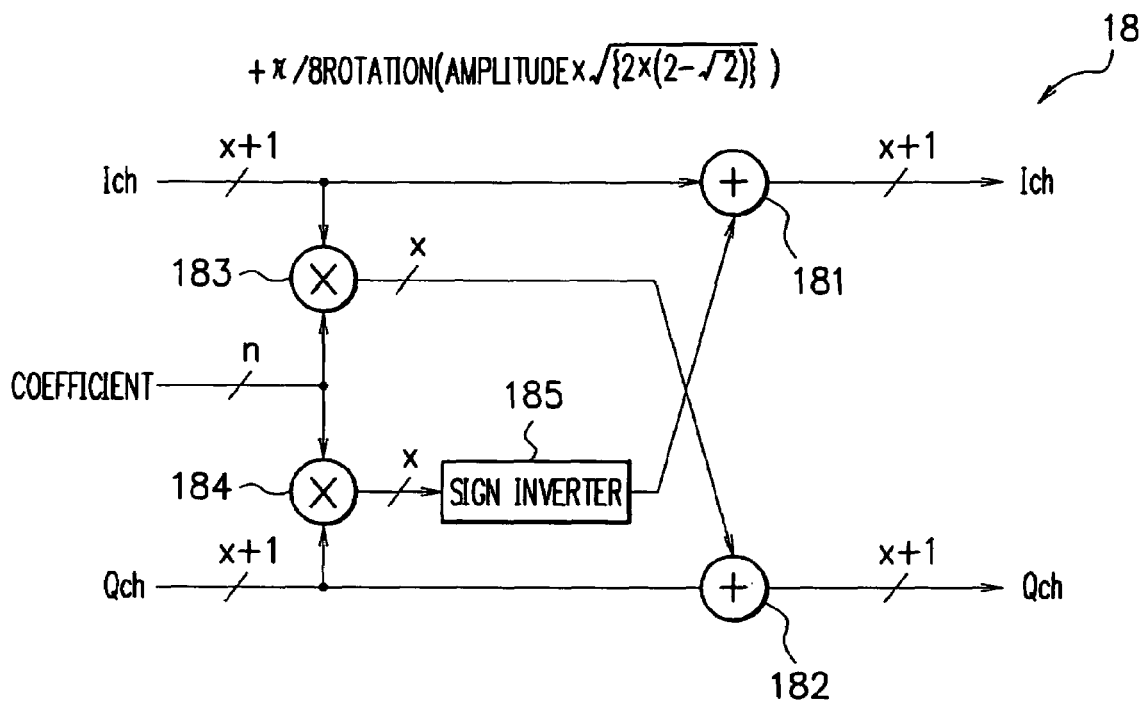
FIG. 6 is a schematic diagram of a phase rotating section 18 of FIG. 2.
Figure 7:
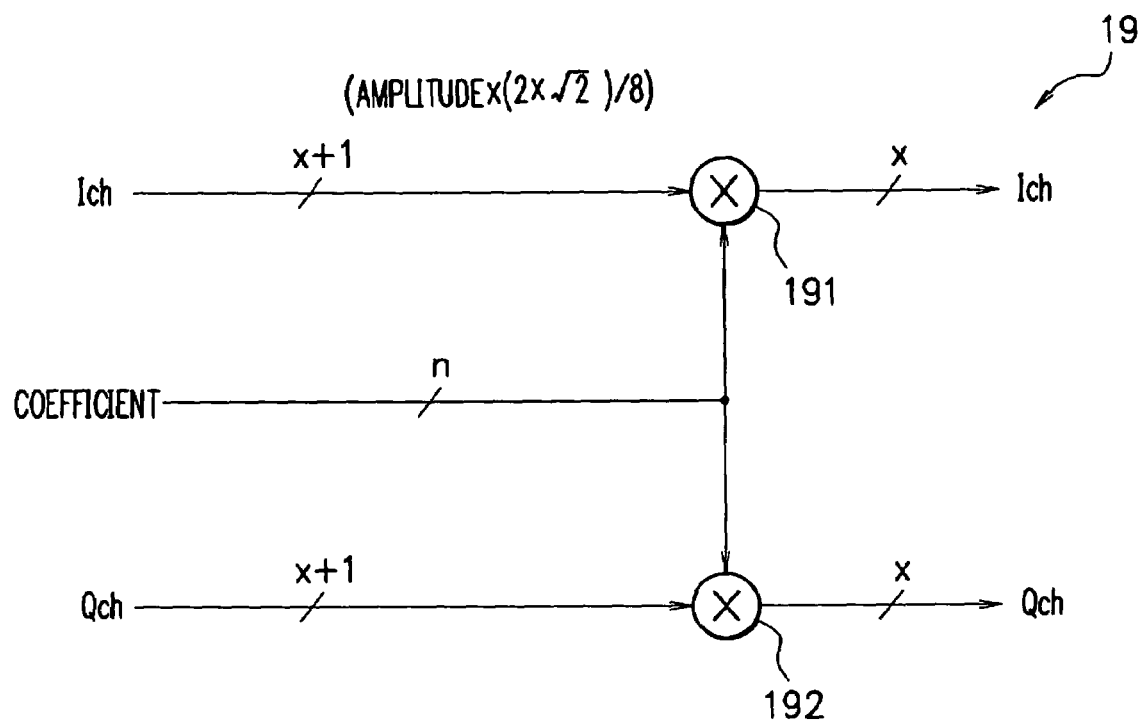
FIG. 7 is a schematic diagram of an amplitude adjuster 19 of FIG. 2.

FIGS. 3 to 6 show specific examples of the phase rotating sections 12, 14, 16, and 18, respectively. The amplitude adjuster (amplitude scaling section) 19 is disposed to restore (through compensation and adjustment) the amplitude value of the signal reduced through the rectangular clipping and the phase rotation to the original amplitude value (level) of the input signal. FIG. 7 shows a concrete example of the operation.

When the orthogonal components of the baseband signal, namely, the I and Q signals are fed from a baseband signal processing module (not shown) to the clipping circuit system, the signals are fed to the 16-gonal clipping circuit 1 and are clipped therein to be fed to the selector 7. The I and Q signals are also delivered to the absolute value generating module 2 to be processed therein such that absolute values |RI| and |RQ| are fed to the I/Q adding module 3 to be added to each other as |RI|+|RQ|. The output signal |RI|+|RQ| is supplied to the comparator 4 to be compared with the clip level RL to produce a comparison result signal according to whether or not the signal is equal to or more than the clip level RL. The comparison result signal is adopted as a selection signal of the selector 7.

The I and Q signals are further sent to the timing adjusting module 6. For the input signals, the module 6 adjusts timing to provide a period of time necessary for the 16-gonal clipping operation and then feeds the resultant signal to the selector 7. The selector 7 outputs therefrom the signal from the 16-gonal clipping circuit 1 if the value of the input signal is more than the clip level RL in the comparator 4. Otherwise, i.e., if the input signal value is equal to or less than the clip level RL in the comparator 4, the selector 7 delivers therefrom the signal sent from the timing adjuster 6. The operation of the selector 7 is conducted for the following reason. If the 16-gonal clipping is carried out for all signals, the clipping operation is accomplished also for signals for which power need not be limited. To avoid this disadvantageous event, the selecting module 7 is disposed to carry out the clipping only for the signals requiring the clipping operation. The AND gate 8 is arranged so that a mask control operation is easily conducted for the clipping operation according to an external instruction.

For the (I,Q) signal fed to the clipping circuit 1, the rectangular clipping circuit 11 carries out the rectangular clipping by use of a clip level of RL0 where RL0 satisfies $$RL0=RL$$

and is externally designated. The phase of the signal clipped by the circuit 11 is rotated +π/4 in the phase rotating module 12. As can be seen from FIG. 3, the module 12 is in a known configuration including adders 121 and 122 and a sign inverting module 123. In the phase rotating module 12, the I and Q signals are added to each other by the adder 122 into a Q signal, and the I signal and a sign-inverted signal of the Q signal are added to each other by the adder 121 into an I signal. As a result of the +π/4 rotation, the signal amplitude is multiplied by $\sqrt{2}$.

The signal produced from the phase rotating section 12 is supplied to the rectangular clipping circuit 13. The clip level RL is externally set as follows:

$$RL1 = RL0 \times \sqrt{2} = RL\sqrt{2}.$$

Figure 8A:
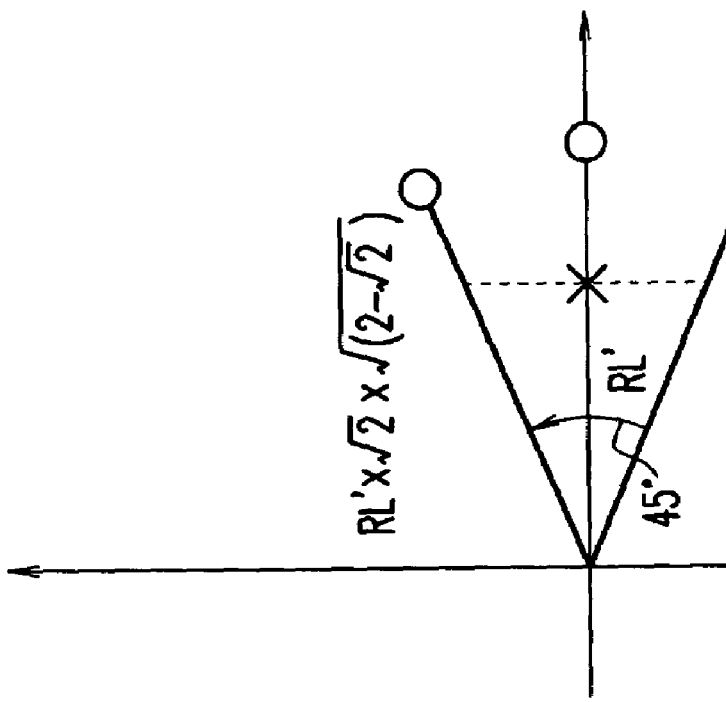
FIG. 8A is a graph to explain change in a clip level (RL) at $\pi/4$ phase rotation.
Figure 8B:
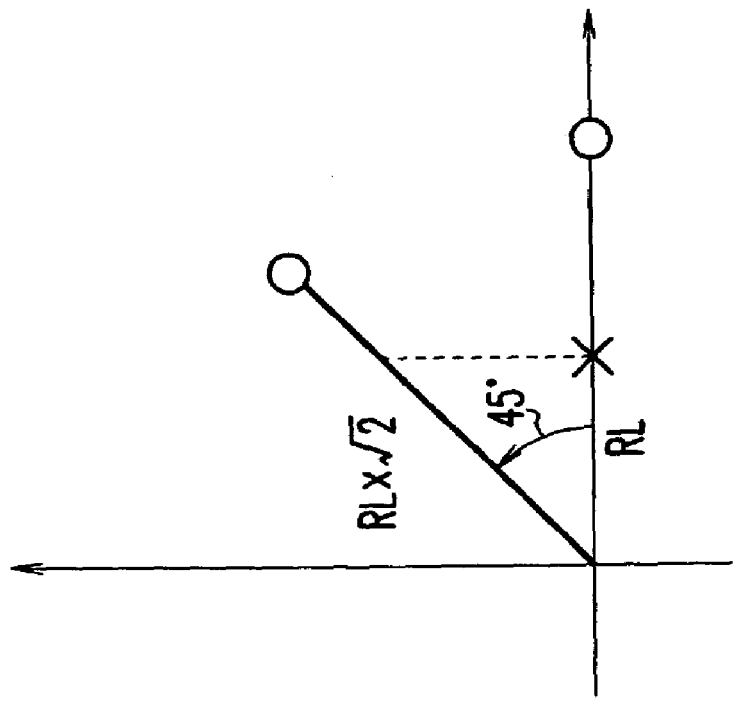
FIG. 8B is a graph to explain change in a clip level (RL) at $\pi/8$ phase rotation.

This is because the signal phase is rotated +π/4 by the phase rotating module 12 to multiply the original amplitude by $\sqrt{2}$. That is, the clip level must be increased as much. In FIG. 8, it is shown that when the signal phase is rotated +π/4, the clip level is also multiplied by $\sqrt{2}$. This can be derived from the Pythagorean theorem.

Thereafter, the phase rotating module 14 rotates the signal phase by −π/8. As can be seen from FIG. 4, the module 14 includes a commonly utilized configuration including adders 141 and 142, multipliers 143 and 144, and a sign inverting section 145. The multiplier 143 multiplies the I signal by a coefficient (n bits) to produce a product. Of the product, n low-order bits are rounded off, and the sign of the resultant signal is inverted to be fed to the adder 142. The adder 142 adds the inverted signal to the Q signal to generate a Q signal. The multiplier 144 multiplies the Q signal by a coefficient to obtain a product. From the product, n low-order bits are removed. The resultant signal is fed to the adder 141. The adder 14 adds the signal to the I signal to produce an I signal. Through the −π/8 rotation, the signal amplitude is multiplied by $\sqrt{\{2 \times (2-\sqrt{2})\}}$.

The phase rotating module 14 delivers the output signal to the rectangular clipping circuit 15. The clip level of the circuit 15 is externally set in consideration of the amplitude variation through the module 14 as follows:

$$RL2 = RL1 \times \sqrt{\{2 \times (2-\sqrt{2})\}}$$
$$= RL0 \times \sqrt{2} \times \sqrt{\{2 \times (2-\sqrt{2})\}}$$
$$= RL \times 2 \times \sqrt{(2-\sqrt{2})}$$

Figure 9:
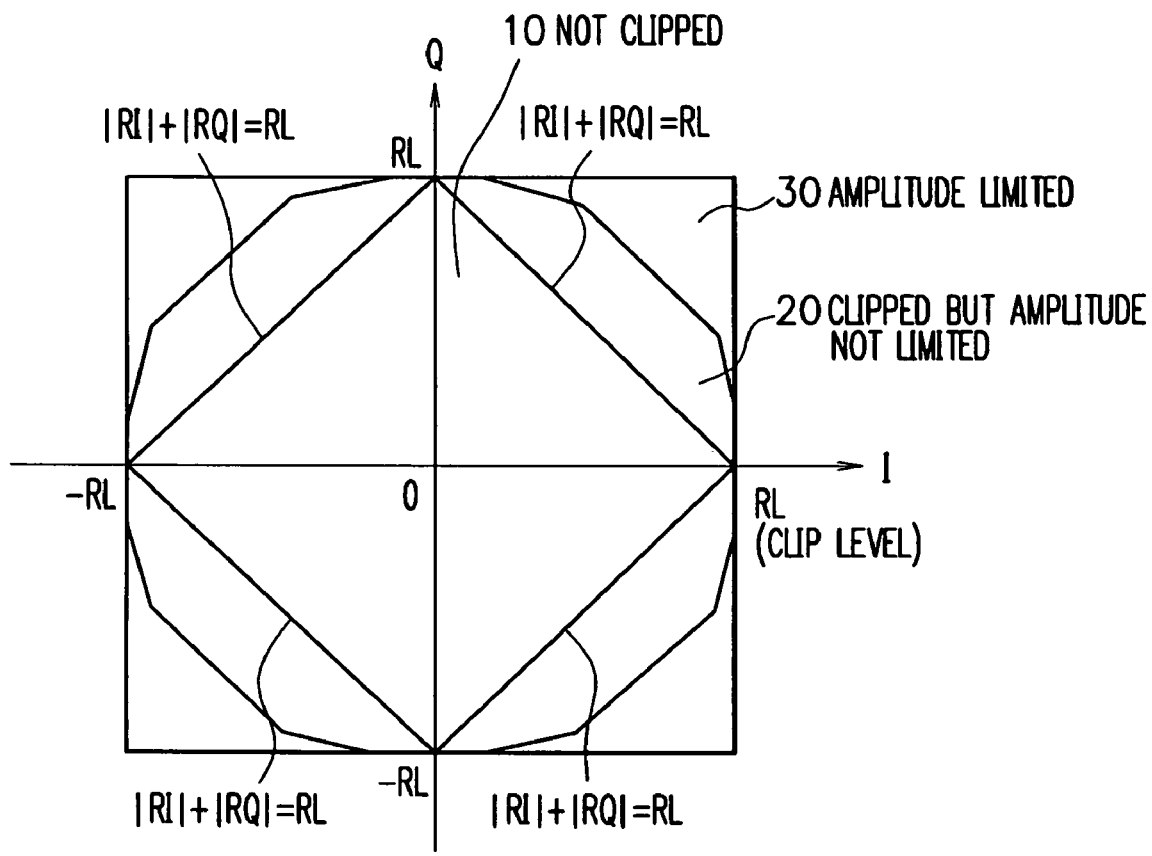
FIG. 9 is a graph showing a clip level for 16-gonal clipping in an IQ coordinate system in accordance with the present invention.

As can be seen from FIG. 9, the clip level is multiplied by $\sqrt{2} \times \sqrt{(2-\sqrt{2})}$, i.e., $\sqrt{\{2 \times (2-\sqrt{2})\}}$ as a result of the phase rotation of π/8.

Figure 4:
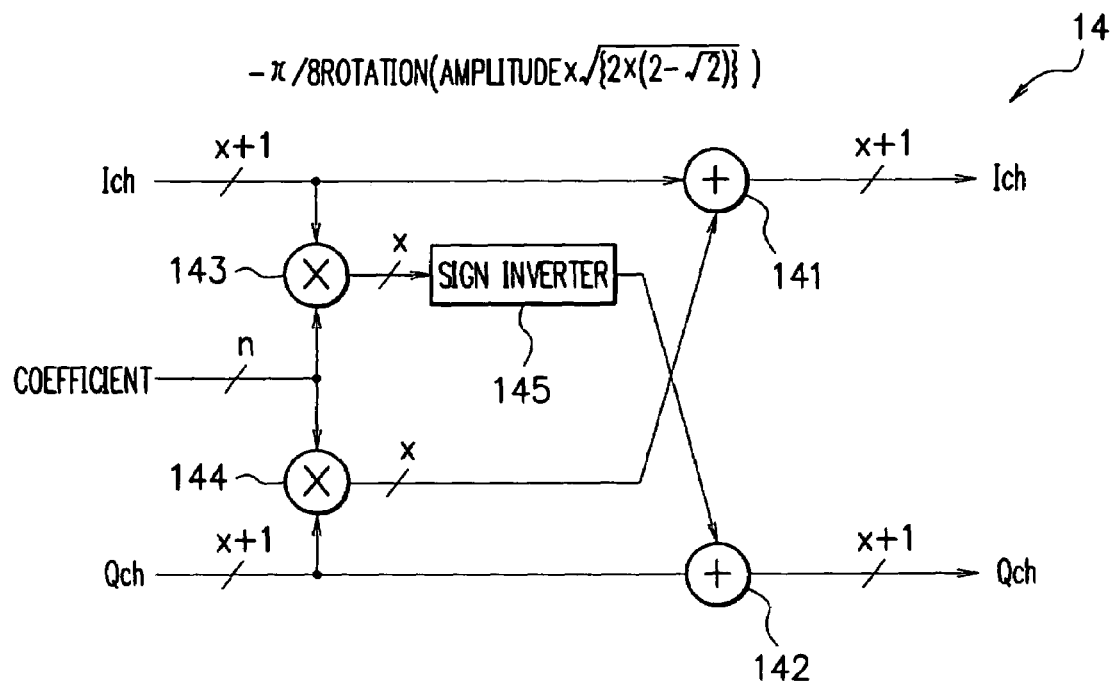
FIG. 4 is a schematic diagram of a phase rotating section 14 of FIG. 2.
Figure 5:
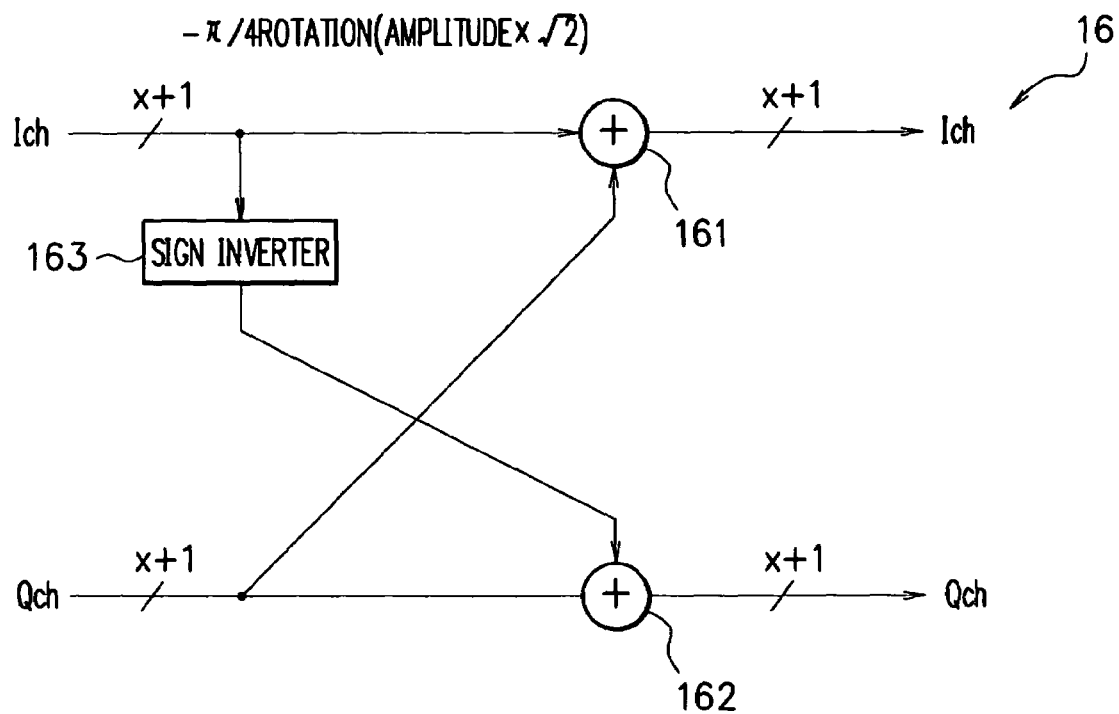
FIG. 5 is a schematic diagram of a phase rotating section 16 of FIG. 2.

Next, the phase rotating section 16 rotates the signal phase by −π/4. The section 16 is constructed in a well-known structure including adders 161 and 162 and a sign inverting module 163 as shown in FIG. 4. The adder 161 adds the I signal to the Q signal to produce an I signal. The adder 162 adds a sign-inverted signal of the I signal to the Q signal to obtain a Q signal. Through the −π/4 phase rotation, the signal amplitude becomes $\sqrt{2}$ times longer in almost the same way as for the phase rotating module 12.

The phase rotating section 16 feeds the output signal to the rectangular clipping circuit 17 with a clipping level of RL3. The level is externally designated as follows paying attention to the amplitude alteration through the phase rotating module 16:

$$RL3 = RL2 \times \sqrt{2}$$
$$= RL \times 2\sqrt{2} \times \sqrt{(2-\sqrt{2})}.$$

The rectangular clipping unit 17 feeds the output signal to the phase rotating module 18. The module 18 rotates the phase of the signal by +π/8. The module 18 includes a commonly known configuration as shown in FIG. 6, specifically, adders 181 and 182, multipliers 183 and 184, and a sign inverting section module 185. The multiplier 183 multiplies the I signal by an n-bit coefficient to produce a product of which n lower bits are rounded off and a resultant signal is fed to the adder 182. The adder 182 adds the signal to the Q signal to generate a Q signal. The multiplier 184 multiplies the Q signal by a coefficient to attain a product from which n low-order bits are removed. Thereafter the sign of the signal is inverted and the obtained signal is transferred to the adder 181. The adder 181 adds the signal to the I signal to produce an I signal.

As a result of the −π/4 rotation, the signal amplitude is multiplied by $\sqrt{\{2 \times (2-\sqrt{2})\}}$. The quantity of phase rotation can be controlled by adjusting the value of the coefficient n in FIG. 6 and FIG. 4. Since ±π/8 is employed in the embodiment, the fixed coefficient value is supplied in association with the rotation.

Finally, the amplitude adjusting section 19 restores the amplitude value reduced due to the rectangular clipping and the phase rotation to the original level of the amplitude of the input signal. FIG. 7 shows an example of a structure of the amplitude adjuster 19 including multiplying modules 191 and 192. The multiplier 191 multiplies the I signal by an n-bit coefficient to produce an I signal. The multiplier 192 multiplies the Q signal by a coefficient to generate a Q signal. In the adjustment, the amplitude is multiplied by $(2+\sqrt{2})/8$.

Description has been given of an example of operation of the 16-gonal clipping circuit in accordance with the present invention. FIG. 9 shows a relationship between the clip level RL and the clipping operation of the clipping circuit on an I-Q coordinate system. In a square 10 drawn in an inner-most position, a diagonal represents the clip level RL and each edge is RL=|RI|+|RQ|. An area within the square corresponds to a range in which the clipping is not conducted, namely, to the signal level of each signal passed through the timing adjuster 6 of FIG. 1. A 16-gon 20 enclosing the square 10 indicates a boundary of the clip level of the 16-gonal clipping circuit 1 of FIG. 1 in accordance with the present invention. An area 30 outside the 16-gon 20 corresponds to a range for the amplitude limitation. The areas between the square 10 and the 16-gon represents the zones where signals pass the clipping processing circuit and their amplitude is not limited.

The 16-gonal clipping is enabled by processing the signal through a sequence of the processing circuits shown in FIG. 2. Therefore, the characteristic equivalent to that of the circular clipping is obtained. That is, the phase error can be suppressed to the maximum extent to thereby prevent deterioration of the error vector magnitude of the modulated wave. The polygonal clipping may also be implemented by changing the number of stages of the rectangular clipping circuits and the stages of the phase rotating modules and by altering the adjusting value of the amplitude adjuster (amplitude scaling section) in the final stage.

For example, when it is desired to possibly reduce the phase error in a clipped baseband signal, a 32-gonal clipping circuit may also be implemented. That is, the number of stages of rectangular clipping circuits is doubled, and the phase rotation angle and the amplitude adjusting value are appropriately changed. As a result, the clipping operation much more tends to the circular clipping.

In FIG. 1, the selector 7 is arranged as an output module in the circuit system to select either one of the outputs of the timing adjuster 6 and the 16-gonal clipping circuit 1 in response to the output of the comparator 4. However, the selector 7 may be disposed at an input stage to deliver a signal therefrom to either one of the timing adjuster 6 and the 16-gonal clipping circuit 1 depending on an output signal from the comparator 4.

The invention claimed is:

1. A clipping circuit for limiting amplitude of an orthogonal baseband signal to be supplied to a power amplifier in a radio transmitter, comprising:
 polygonal clipping means including a plurality of stages in cascade connection, each of the stages comprising rectangular clipping means and phase rotating means connected in series, and
 amplitude adjusting means for compensating and adjusting a change in signal amplitude of the baseband signal from the rectangular clipping means and the phase rotating means.

2. The clipping circuit in accordance with claim 1,
 the rectangular clipping means in a first stage including a clip level beforehand set to a predetermined clip level,
 each of the rectangular clipping means in a second and subsequent stages including a clip level set to a value obtained by multiplying the predetermined clip level by a quantity of correction corresponding to variation in amplitude of the baseband signal associated with phase rotation in the phase rotating means in a previous stage of the rectangular clipping means.

3. The clipping circuit in accordance with claim 1, further comprising control means for controlling, if the amplitude of the orthogonal baseband signal takes a value more than the predetermined clip level, the polygonal clipping means to process the orthogonal baseband signal.

4. A transmitter comprising a clipping circuit in accordance with claim 1.

5. A clipping circuit for limiting amplitude of an orthogonal baseband signal to be supplied to a power amplifier in a radio transmitter, comprising:
 polygonal clipping means including a plurality of stages in cascade connection, each of the stages comprising rectangular clipping means and phase rotating means connected in series,
 the rectangular clipping means in a first stage including a clip level beforehand set to a predetermined clip level,
 each of the rectangular clipping means in a second and subsequent stages including a clip level set to a value obtained by multiplying the predetermined clip level by a quantity of correction corresponding to variation in amplitude of the baseband signal associated with phase rotation in the phase rotating means in a previous stage of the rectangular clipping means.

6. The clipping circuit in accordance with claim 5, further comprising control means for controlling, if the amplitude of the orthogonal baseband signal takes a value more than the predetermined clip level, the polygonal clipping means to process the orthogonal baseband signal.

7. A transmitter comprising a clipping circuit in accordance with claim 5.

8. A clipping circuit for limiting amplitude of an orthogonal baseband signal to be supplied to a power amplifier in a radio transmitter, comprising:
 polygonal clipping means including a plurality of stages in cascade connection, each of the stages comprising rectangular clipping means and phase rotating means connected in series, and
 control means for controlling, if the amplitude of the orthogonal baseband signal takes a value more than the predetermined clip level, the polygonal clipping means to process the orthogonal baseband signal,
 wherein if the amplitude of the orthogonal baseband signal takes a value equal to or less than the predetermined clip level, the control means adjusts time for output of the orthogonal baseband signal corresponding to processing time of the polygonal clipping means.

9. A transmitter comprising a clipping circuit in accordance with claim 8.

* * * * *